May 18, 1954     F. D. BERGSTEIN     2,678,679
BOTTOM SEALING MEANS AND METHOD FOR PLASTIC BAGS
Filed Aug. 18, 1951
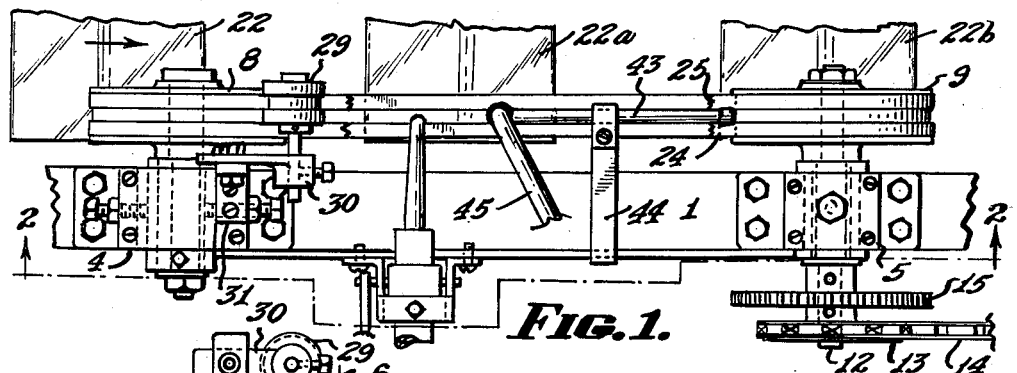
FIG. 1.
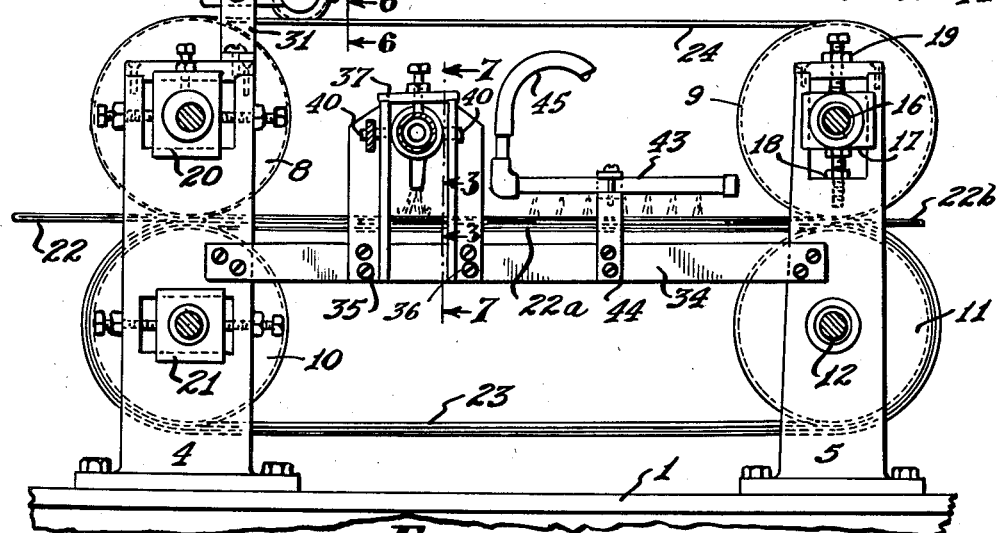
FIG. 2.
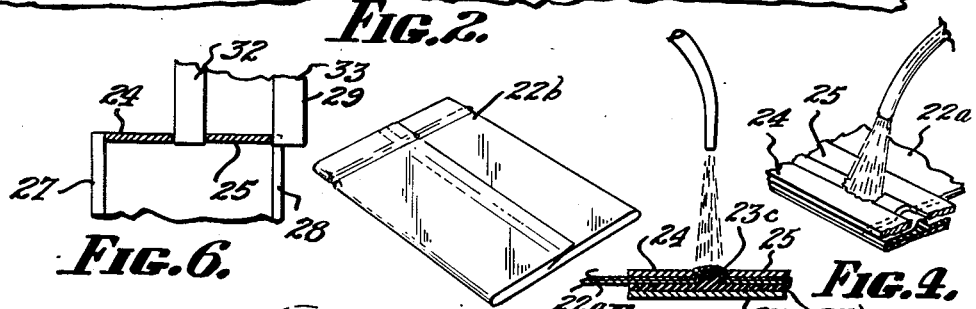
FIG. 6.    FIG. 8.   FIG. 3.   FIG. 4.
FIG. 5.
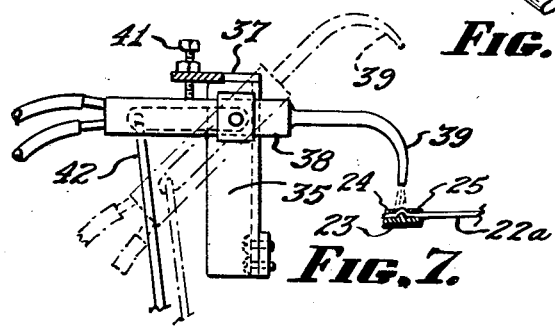
FIG. 7.
INVENTOR.
FRANK DAVID BERGSTEIN,
BY
Allen & Allen
ATTORNEYS.

Patented May 18, 1954

2,678,679

UNITED STATES PATENT OFFICE 2,678,679

BOTTOM SEALING MEANS AND METHOD FOR PLASTIC BAGS

Frank David Bergstein, Hamilton, Ohio

Application August 18, 1951, Serial No. 242,503

8 Claims. (Cl. 154—42)

My invention has to do with the manufacture of bags from sheets or endless lengths of plastic material, such for example, as polyethylene. This application is related to the copending case of Walter Haas and myself, Serial No. 149,708, filed March 15, 1950, entitled Method and Means for Heat Sealing Film, now Patent No. 2,660,219, and the application of Back, Serial No. 158,796, filed April 28, 1950, and entitled Transfer and Bottom Sealing Means, now Patent No. 2,668,708. In the first of these copending applications, there is described in general a mechanism for continuously tubing and forming a center seam in a plastic material, such as polyethylene, cutting the tubed product apart into bag lengths, and in a second machine section at right angles to the first, moving the bag lengths along transversely to their major axes, and forming bottom seams therein by heat sealing. The second of these copending applications relates primarily to mechanism for the transfer of the bag lengths from the first machine section to the second, and to means for carrying the bag lengths through the second machine section and heat sealing them as aforesaid.

The specific material of which the bags are made is not a limitation on the present invention, but I shall describe it in connection with the manufacture of bags from polyethylene because this substance, in thin, sheet-like form, presents in a very high degree the problems which this invention is designed to solve. Polyethylene is not only an exceedingly flimsy and limber material, difficult to handle and transport, but it has an exceedingly narrow range of heat sealing temperature, below which it is not sufficiently softened to permit fusing together of the layers in a lapped or face-to-face seam, and above which it tends to become so soft as to separate and lose its integrity as a film.

In spite of the extreme delicacy of the operations involved, the machines and processes of the copending applications have proved very successful in the manufacture of bags at quite high speeds. The polyethylene in thin sheet form is tubed about a former, and a continuous longitudinal seam is formed therein. Curiously enough, as speeds of operation increase, more difficulty is had with the formation of the bottom seams in the cut bag lengths than is encountered in the formation of the longitudinal seam. I believe that the reasons for this are essentially threefold. In the first place, in forming the longitudinal seam, the material is under constant tension and hence is exactly controlled as to position and face-to-face contact of the lapping parts, whereas a similar type of control has not hitherto been possible in the formation of the bottom seams. In the second place, the bottom seam provides a peculiar problem in that at the overlap, i. e. the position of the longitudinal seam, there are three plies of the material to seal through along the bottom, as against two only in the formation of the longitudinal seam. Theoretically at least, this means that 50% more heat is required to seal through the bottom seam at the particular point of overlap, although not elsewhere. In the third place, in the particular commercial machines of the copending applications, when the length of the cut bag sections is shorter than 15 in. (which is the distance between grippers in the second section of the machine), the bag lengths will actually be traveling faster through the second machine section than the uncut material is traveling through the first. For example, when the bag length is 12 in., the material in the second machine section will travel a distance of 15 in. while in the first section cut material is traveling at 12 in. only. In this instance there will be 25% less time, or 25% more heat needed in effecting the bottom seam seal than in making the longitudinal seam on such a bag. It will be realized that these relationships may vary with different machines; but they are indicative of one aspect of the problem.

It is a primary object of my invention to provide a means for effecting positive control and positioning of the material in the second section of a machine of the class to which reference has been made, in which section the effecting of the bottom seam seal is done.

It is an object of my invention to provide means and a method for better control of the application of heat.

It is an object of my invention to provide means for solving the problems set forth above and others, to the end that higher speed production may be effected. In this connection it should be noted that speeds of 10,000 bags per hour have been accomplished and maintained uniformly in the commercial practice of the present invention.

These and other objects of the invention, which will be set forth hereinafter or will be apparent to one skilled in the art upon reading these specifications, I accomplish by that mechanism and in that procedure of which I shall now describe certain exemplary embodiments. Reference is made to the accompanying drawings wherein:

Figure 1 is a partial plan view of the sealing portion fo the second section of the machine.

Figure 2 is a side elevation of the same portion, taken along the line 2—2 of Figure 1.

Figure 3 is a sectional view through the belt arrangement, taken along the section line 3—3 of Figure 2.

Figure 4 is a partial plan view of the belt and sealing means in assembled relationship with a bag length end.

Figure 5 is an enlarged sectional view corresponding generally with Figure 3.

Figure 6 is a partial sectional view taken along the section line 6—6 of Figure 2.

Figure 7 is a sectional view taken along the line 7—7 of Figure 2 and showing the heating means.

Figure 8 is a perspective view of a completed bag formed in accordance with my invention.

In the copending applications to which reference has been made, the sealing means for the bottom ends of the bag lengths has comprised upper and lower metal belts between which the ends of the bag lengths are gripped for sealing. In one modification an upper metal belt may be employed operating against a series of small, closely spaced rotatable rollers on the opposite side of the bag length end. In either event, heat is applied to the bag forming material, through the upper metallic belt, this being one form of control of the heat applied. In the present invention, I depart from this arrangement, and have found it possible to apply heat directly to the plastic material when it is positioned and controlled, as hereinafter described.

In the machine of the Back application referred to above, the bag lengths are transported in the second section of the machine by conveyor elements between which they are frictionally gripped, the leading edges of the bag lengths being engaged by grippers which assist in positioning them and in preventing buckling, cocking and the like. Similar means may be employed in the present instance to move the bag lengths and bring them into engagement with the sealing mechanism hereinafter described; and for this reason I have not illustrated the general means for moving the bag lengths through the second section of the machine. Figures 1 and 2 of the appended drawings show the sealing mechanism per se.

In these drawings 1 indicates a side frame element of the machine. On this element there are mounted a pair of standards 4 and 5 in spaced position. Upper sheave elements 8 and 9 and lower sheave elements 10 and 11 are respectively journaled in these standards. The lower right-hand sheave 11 is affixed to a shaft 12 in the standard 5. This shaft bears a sprocket 13 so that a drive may be applied to the mechanism from the main drive of the machine through a chain 14. A gear element (not shown) is also affixed to the shaft 12; and this gear element meshes with another gear 15 on the shaft 16 of the corresponding upper sprocket 9. It will be seen that in the exemplary machine, the upper sprocket 9 is journaled in the standard 5 in a vertically slidable block 17, the position of which is adjusted in the standard by means of screws 18 and 19, as will be clear from the drawing.

The upper and lower sheaves 8 and 10 on the left-hand side of Figure 2 are journaled respectively in blocks 20 and 21 which are slidable horizontally in the standard 4 and are provided with adjusting means, so that the longitudinal tension of the belts can be varied as desired.

The bag lengths, traveling through the second section of the machine in the direction of the arrow in Figure 1, are indicated at 22, 22a and 22b. They will be understood as moved and controlled by suitable mechanism, such as the conveyor and gripping means referred to above. The sheave means 8, 9, 10 and 11 are employed to drive and control belt means which will now be described. The lower belt is indicated at 23. As will best be seen in Figures 3 and 5, it consists of a lower body element 23a which is preferably of metal, but may be of any other flexible material of suitable strength. Above the element 23a there is another element 23b which is a layer of silicone rubber vulcanized or otherwise firmly attached to the body element 23a. The central portion of the layer 23b is formed with an upwardly projecting, continuous, longitudinal bead 23c. This bead preferably has somewhat rounded edges, and is of constant width longitudinally.

The upper sheaves 8 and 9 carry a pair of metallic belts in spaced relationship rather than a single belt as in previous machines for this purpose. The upper metallic belts are indicated in Figures 3 to 6 inclusive at 24 and 25; and it will be noted that they are spaced from each other by substantially the width of the bead 23c, with allowance for the thickness of the material of the end of the bag tube length.

The upper sheaves 8 and 9 may be formed with a central rib to maintain the spacing of the belts 24 and 25; but since this spacing will be maintained in the lower path of travel of these belts by the bead 23c, I have not ordinarily found this necessary. Instead, I provide a spacer in the top flight of the belts close to the entering sheave 8, preferably making the sheaves 8 and 9 with side flanges only as indicated in Figure 6 at 27 and 28. The spacer referred to conveniently takes the form of a sheave or roller 29 journaled on a lever arm 30 (see Figures 1 and 2). The lever arm in turn is pivoted to a bracket 31 on the standard 4. The roller 29 has a rib 32 engaging between the belts 24 and 25, and it may also have a rib 33 engaging beyond the outer edge of the belt 25. Other forms of roller may be employed including a mere disc-like element adapted to ride between the belts. In the particular form shown, the roller 29 rides on the belt 25, which is a convenient way of maintaining the position of the roller.

In the mechanism thus far described, the upper and lower belts are synchronized so that the bead 23c of the lower belt element projects into the space between the upper belts 24 and 25. The result of this is that when the bag length 22 approaches the sealing mechanism, and begins to enter the pinch between the upper and lower belt elements, the bead 23c forces a portion of the bag between the upper metal belts 24 and 25. This causes the bag wall portions to follow the contour of the bead, while the belts 24 and 25 tension the bag length in the direction of its axis, holding the layers of bag forming material smoothly and securely stretched across the bead, all of this occurring as the bag continues in its course of uniform travel.

If heat can be applied directly to the film walls of the bag lengths, as distinguished from applying it through the body of a transfer means, such as a metal belt, a lessened temperature in the heat applying means may be employed. This is highly advantageous; but I found that the plies of the bag forming material must be held under tension in exactly lapping position whenever heat is directly applied to the film layers. Again, the heating means cannot be brought into direct contact with the film layers if the means is a mechanical one, such for example, as an electric heater actually touching the film. Such a mechanical heating means, not traveling with the film, would rupture the softened, melted film in the sealing area. Therefore, in the practice of my present invention, the heat applying means must be a jet of flame or heated gas.

In the exemplary embodiment of my invention, I carry a bar or support 34 across between the standards 4 and 5, and I mount thereon a pair of uprights 35 and 36 connected at the top by a bridging member 37. A torch element 38, having a nozzle 39, is mounted on trunions 40 between the uprights 35 and 36 so that, as shown in Figure 7, it can be tilted from an operative position in solid lines to an inoperative position shown in dotted lines. A set screw element 41 on the bridge 37 serves to control the distance from the nozzle end to the plies of bag forming material as engaged by the belts. This will be evident from an examination of Figure 7. Preferably, I also provide means for tilting the torch to the inoperative position shown in that figure automatically upon the stopping of the machine including, of course, the belts and conveying mechanism. To this end I have shown a link element 42 attached to the torch; and this link element will be understood as actuated by such means as are disclosed for the purpose in the copending applications referred to above. A flame or jet of heated gas from the nozzle 39 impinges directly upon the layers of bag forming material as they are stretched over the bead 23c of the lower belt element, this relationship being illustrated in Figures 3, 4 and 7.

It will be observed that the heat is applied directly to the layers of bag forming material; but the heat cannot spread laterally because of the cooling effect of the upper metal belts 24 and 25.

Cooling means will follow the heating means in the direction of motion of the bag lengths. In the present instance, however, these cooling means may be very simple in construction although preferably they will have large cooling capacity. Instead of watercooling shoes and the like (which may, of course, be employed if desired), I have found it sufficient merely to position above the belt assembly a manifold 43 by means of an upright 44 on the support 34. This manifold is connected with a source of compressed air at substantially room temperature by means of a conduit 45; and the manifold is pierced below by jet-forming openings so that the belt assembly and the engaged bag length end are bathed in cooling fluid immediately after the action of the torch thereon.

Operating in this fashion and with mechanism of the character described, I am able rapidly and positively to weld or fuse together the film layers making up the bag length end. I may employ a blast of preheated gas; but a flame of ordinarily illuminating gas or other fuel mixed with air is sufficient for the purpose even at high speeds. The heat requirements are by no means as high as would be encountered in an operation in which heat had to be transmitted to the material through an overlying metallic belt. There is further no time lag in the heat transmission. The skilled operator will readily be able to adjust the heat of the gas or flame to the speed of the material to accomplish perfect welding under the circumstances herein outlined. After the heating, the parts are, of course, concurrently cooled with the film portions which have been fused. As a consequence, the conditions at the time of the application of the flame are always identical and subject to control. Very high speeds may be accomplished in bag formation by the procedure set forth hereinabove.

Having thus described my invention in an exemplary embodiment, what I claim as new and desire to secure by Letters Patent is:

1. Apparatus for forming end seams in bag tube lengths, and comprising a first continuously moving member having a surface for contacting the bag tube length ends, and having a ridge formed centrally longitudinally of the said surface, and a pair of spaced continuously moving members for contacting the opposite side of said bag tube length ends and pressing the material against the said surface thereof, said last named moving members lying to opposite sides of said ridge and acting to stretch the material across the said ridge and bring the plies thereof into exact tensioned conformation, and means for applying a jet of flame to the plies of the material of said bag tube lengths ends in the portions thereof tensioned across said ridge.

2. The structure claimed in claim 1, wherein said first mentioned member is a longitudinally traveling belt, said belt having a surface including said ridge and formed of heat resisting substance.

3. The structure claimed in claim 1 wherein said first mentioned member is a longitudinally traveling belt, said belt having a surface including said ridge and formed of heat resisting substance, namely silicone rubber.

4. In an apparatus for the purpose described, a machine base, a pair of spaced standards thereon, upper and lower sheaves journaled on said standards for accepting belts, a lower belt on the lower sheaves, said belt having an upper surface and a longitudinal ridge projecting centrally continuously above said surface, and a pair of belts on the upper ones of said sheaves, said last mentioned belts being spaced from each other substantially the width of the said ridge, the upper flight of the lower belt and the lower flights of the upper belts substantially coinciding, whereby a bag tube end may be brought therebetween, the upper belts serving to press the material of said bag tube end against the surface of the lower belt and stretch the said material across said ridge in the general direction of the axis of the bag tube length.

5. The structure claimed in claim 4 in combination with means for applying a blast of heated gas to the material of said bag tube ends, while so engaged.

6. The structure claimed in claim 4 in combination with means for applying a blast of heated gas to the material of said bag tube ends, while so engaged, and means further in the direction of travel of said belt flights and bag tube ends for applying a cooling fluid thereto.

7. A process for forming bottom seams in tubed bag lengths of heat-sealable material by means of a jet flame, which process comprises the steps of continuously moving the bag lengths transversely to their axes, tensioning portions of the said bag lengths adjacent their bottom ends in the direction of the bag length axes so as to conform the plies of the bag lengths exactly to each other in a relatively narrow area extending the full width of the bag lengths, and while the plies are so tensioned, applying a jet of flame directly to the tensioned areas of the moving bag lengths to fuse them together.

8. A process of forming bottom seams in tubed bag lengths of heat-sealable material by means of a stationary jet of flame, which process comprises the steps of continuously moving the bag lengths transversely to their axes, tensioning portions of said bag lengths adjacent their bottom ends across an upstanding ridge so as to conform the plies of the bag lengths ends exactly to each other in a relatively narrow area extending the full width of the bag lengths, and while the plies are so tensioned, applying a stationary jet of flame directly to the tensioned areas of moving bag lengths to fuse them together, the stationary jet of flame impinging directly on those areas of the bag lengths which are tensioned across the ridge.

References Cited in the file of this patent

UNITED STATES PATENTS

| Number | Name | Date |
|---|---|---|
| 2,407,495 | High et al. | Sept. 10, 1946 |
| 2,413,970 | Hawley | Jan. 7, 1947 |
| 2,429,177 | Young | Oct. 14, 1947 |
| 2,444,685 | Waters | July 6, 1948 |
| 2,488,212 | Lloyd | Nov. 15, 1949 |
| 2,504,500 | Collins | Apr. 18, 1950 |
| 2,509,439 | Langer | May 30, 1950 |
| 2,516,280 | Welch | July 25, 1950 |
| 2,542,901 | Chaffee | Feb. 20, 1951 |
| 2,562,146 | Hultkrans | July 24, 1951 |
| 2,579,088 | Piazze et al. | Dec. 18, 1951 |
| 2,591,383 | Spalding | Apr. 1, 1952 |
| 2,591,935 | Heigl | Apr. 8, 1952 |
| 2,614,953 | Anglada | Oct. 21, 1952 |
| 2,625,201 | Smith | Jan. 13, 1953 |